(12) United States Patent
Liu et al.

(10) Patent No.: US 8,819,910 B2
(45) Date of Patent: Sep. 2, 2014

(54) POSITIONING TOOL FOR FAN

(75) Inventors: Yu-Lan Liu, Wuhan (CN); Chang-Jun Li, Wuhan (CN); Chao-Jie Cai, Wuhan (CN); Yu-Lin Liu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 196 days.

(21) Appl. No.: 13/585,206

(22) Filed: Aug. 14, 2012

(65) Prior Publication Data

US 2013/0145592 A1 Jun. 13, 2013

(30) Foreign Application Priority Data

Dec. 12, 2011 (CN) .......................... 2011 1 0411744

(51) Int. Cl.
*B23P 19/04* (2006.01)
*B25B 27/14* (2006.01)
*F01D 25/28* (2006.01)
*F01D 25/26* (2006.01)
*F16M 7/00* (2006.01)

(52) U.S. Cl.
USPC ............. 29/271; 29/266; 415/213.1; 248/674

(58) Field of Classification Search
USPC ............................................................ 29/271
See application file for complete search history.

(56) References Cited

U.S. PATENT DOCUMENTS

| 4,398,706 | A | * | 8/1983 | Kaulfuss ......................... 269/88 |
|---|---|---|---|---|
| 5,177,853 | A | * | 1/1993 | Herook ............................ 29/266 |
| 7,458,141 | B2 | * | 12/2008 | Goldburt et al. ................ 29/464 |
| 7,921,532 | B2 | * | 4/2011 | Heaton ............................ 29/270 |
| 7,946,012 | B2 | * | 5/2011 | Cox et al. ........................ 29/255 |
| 2009/0199382 | A1 | * | 8/2009 | Heaton ............................ 29/270 |

FOREIGN PATENT DOCUMENTS

TW M299087 10/2006
TW M387749 9/2010

* cited by examiner

*Primary Examiner* — Lee D Wilson
*Assistant Examiner* — Alvin Grant
(74) *Attorney, Agent, or Firm* — Novak Druce Connolly Bove + Quigg LLP

(57) ABSTRACT

A positioning tool includes an actuating member and a rotating member rotatably attached to the actuating member. The actuating member includes a supporting lump. Two positioning pins are located on the supporting lump. The rotating member includes a rotating plate located between the two positioning pins. Three latching pins are located on the rotating plate.

20 Claims, 4 Drawing Sheets

POSITIONING TOOL FOR FAN

BACKGROUND

1. Technical Field

The present disclosure relates to positioning tools, and particularly to a positioning tool which can position a fan on an enclosure.

2. Description of Related Art

Computers include a plurality of heat generating components, such as central processing units (CPUs) and power supplies. A fan attached to the CPU dissipates heat generated from the CPU. A fan attached to the power supply works in the same way. The fans are generally mounted in the computer enclosures by screws, which require the use of a tool. One hand of a user supports the fan to align each of the installation holes with each of the securing holes, and another hand has to insert the screw into the installation holes and securing holes. The attachment procedure is tedious and inconvenient, especially when the enclosure is small.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
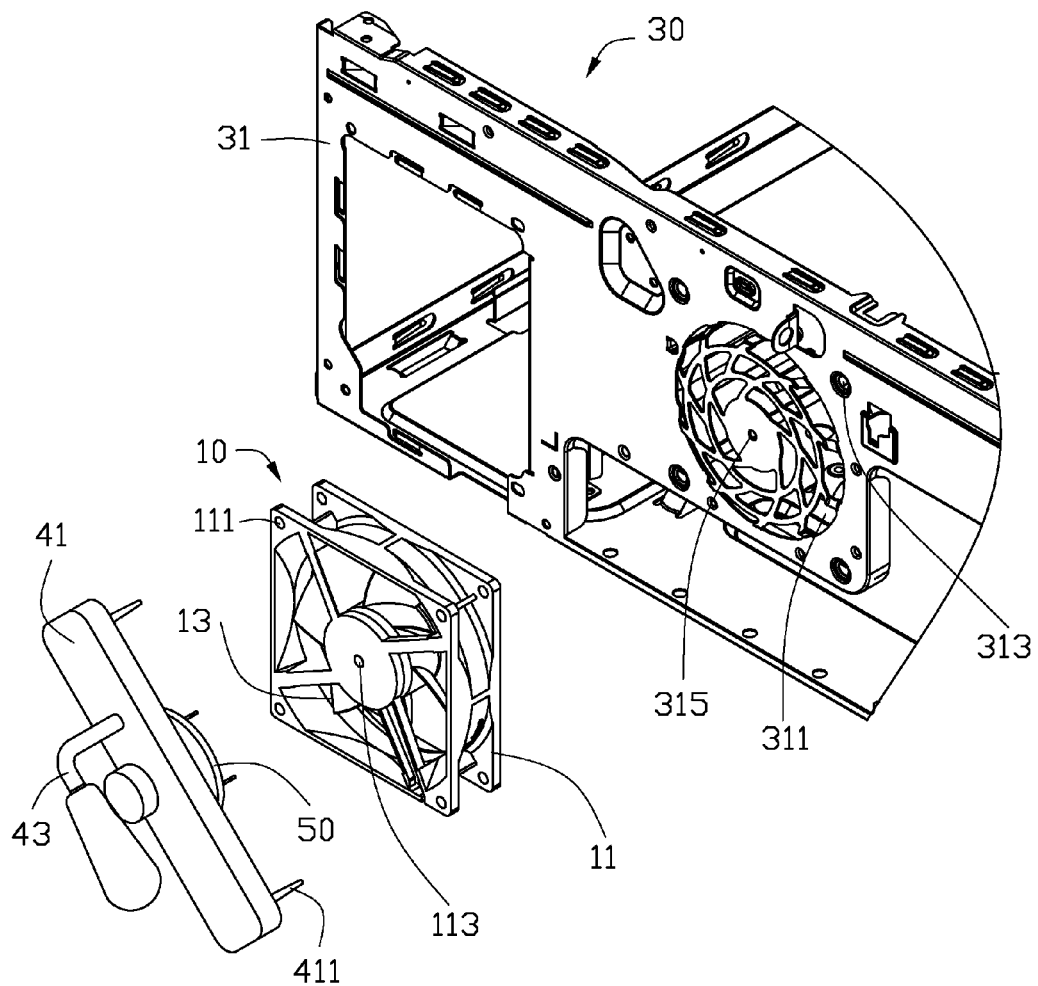
FIG. 1 is an exploded, isometric view of an embodiment of an enclosure, a fan, and a positioning tool.

Referring to FIG. 1, a positioning tool in accordance with an embodiment is shown. The positioning tool is used to position a fan 10 on an enclosure 30. The positioning tool includes an actuating member 40 and a rotating member 50 attached on the actuating member 40.

The fan 10 includes two installation boards 11 and a plurality of blades 13 located between the two installation boards 11. Each of the two installation boards 11 defines four installation holes 111 and a limiting hole 113 extending to the two installation boards 11. The four installation holes 111 are arranged at four corners of each of the two installation boards 11.

The enclosure includes a rear wall 31. The rear wall 31 defines a plurality of through holes 311 for dissipating heat generated by a heat generating member (not shown). Four securing holes 313, outside of the plurality of through holes 311, are defined in the rear wall 31. The four securing holes 313 are arranged at four corners of a rectangle. A positioning hole 315 is defined in the rear wall 31 among the four securing holes 313.

Figure 2:
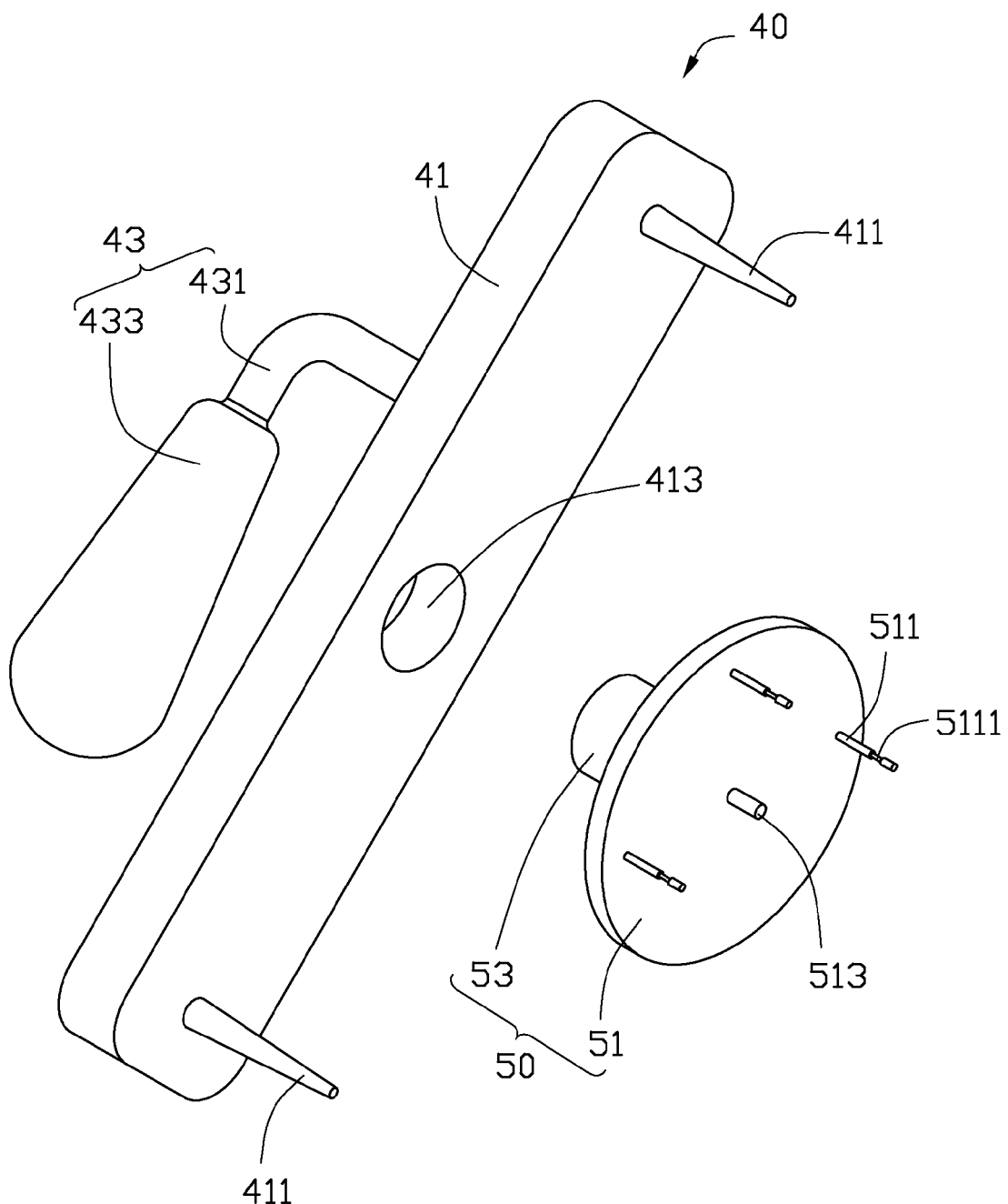
FIG. 2 is an exploded, isometric view of the positioning tool of FIG. 1.

Referring to FIG. 2, the actuating member 40 includes a supporting lump 41 and a handle 43 located on one side of the supporting lump 41. Two positioning pins 411, opposite to the handle 43, are located on the supporting lump 41. In one embodiment, each of the two positioning pins 411 is substantially cone-shaped. A first distance is defined between the two latching pins 411. A second distance is running diagonally through a center of two of the four installation holes 111. A third distance is running diagonally through a center of two of the four securing holes 313. The first distance is substantially equal to the second distance and the third distance. A pivot hole 413, is defined in the supporting lump 41 between a middle of the two latching pins 411. The handle 43 includes a connecting portion 431 and an operating portion 433. The connecting portion 431 is substantially L-shaped and is connected to the supporting lump 41 and the operating portion 433.

The rotating member 50 includes a circular rotating plate 51 and a pivot portion 53 located on one side of the rotating plate 51. In one embodiment, the pivot portion 53 is substantially columnar, the pivot hole 413 is circular, and a diameter of the pivot portion 53 is greater than that of the pivot hole 413. Three latching pins 511 are located on the rotating plate 51 opposite to the pivot portion 53. A latching slot 5111 is defined in each of the three latching pins 511. Three latching pins 511 are substantially arranged at three corners of an equilateral triangle. A limiting post 513 is located on the rotating plate 51 among the three latching pins 511. The limiting post 513 is capable of extending through the positioning hole 315 to insert into the limiting hole 113.

Referring to FIG. 1, in assembly of the rotating member 50 to the actuating member 40, the rotating member 50 is compressed to be inserted into the pivot hole 413, to secure to the rotating member 50 to the actuating member 40.

Figure 3:
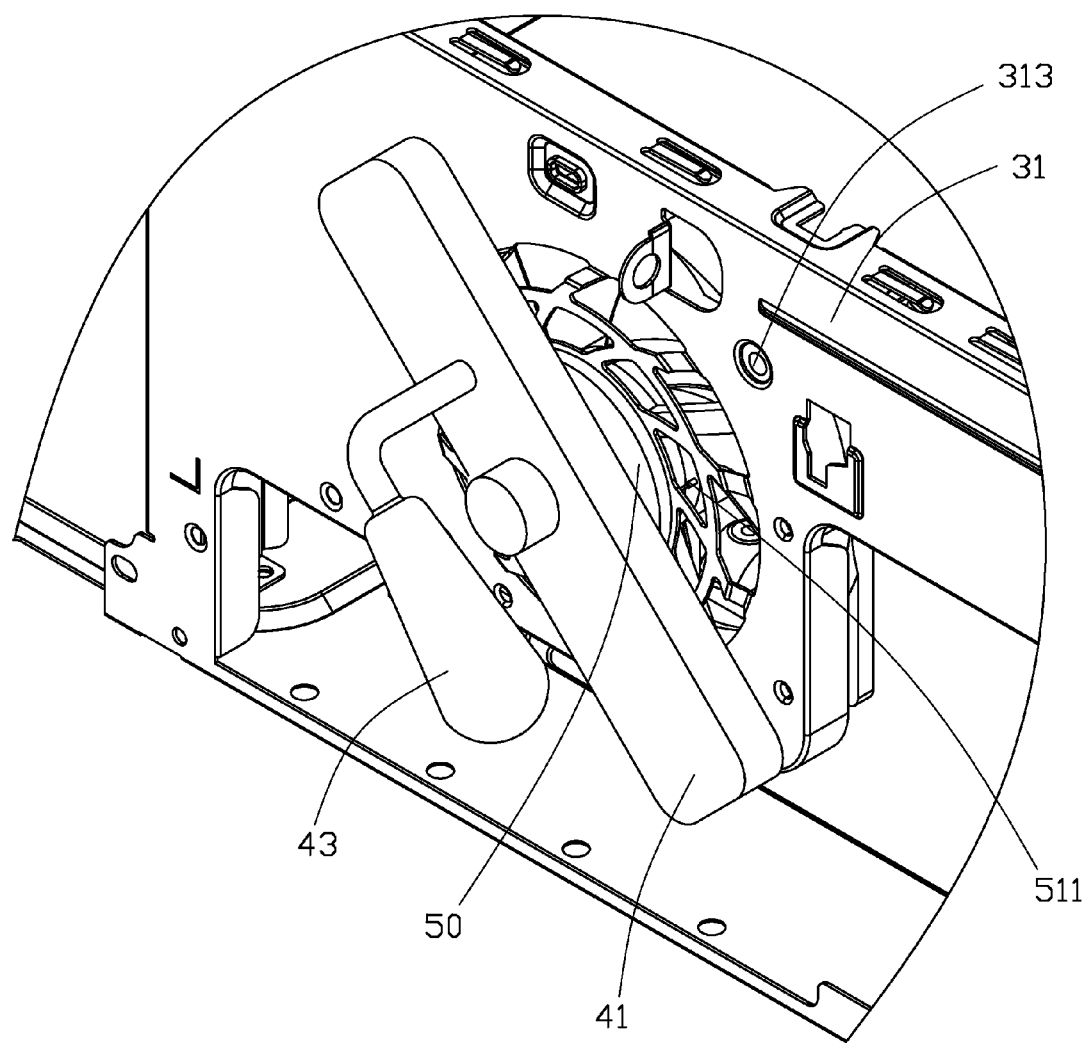
FIG. 3 is an assembled, cutaway view of the positioning tool, the enclosure and the fan of FIG. 1.
Figure 4:
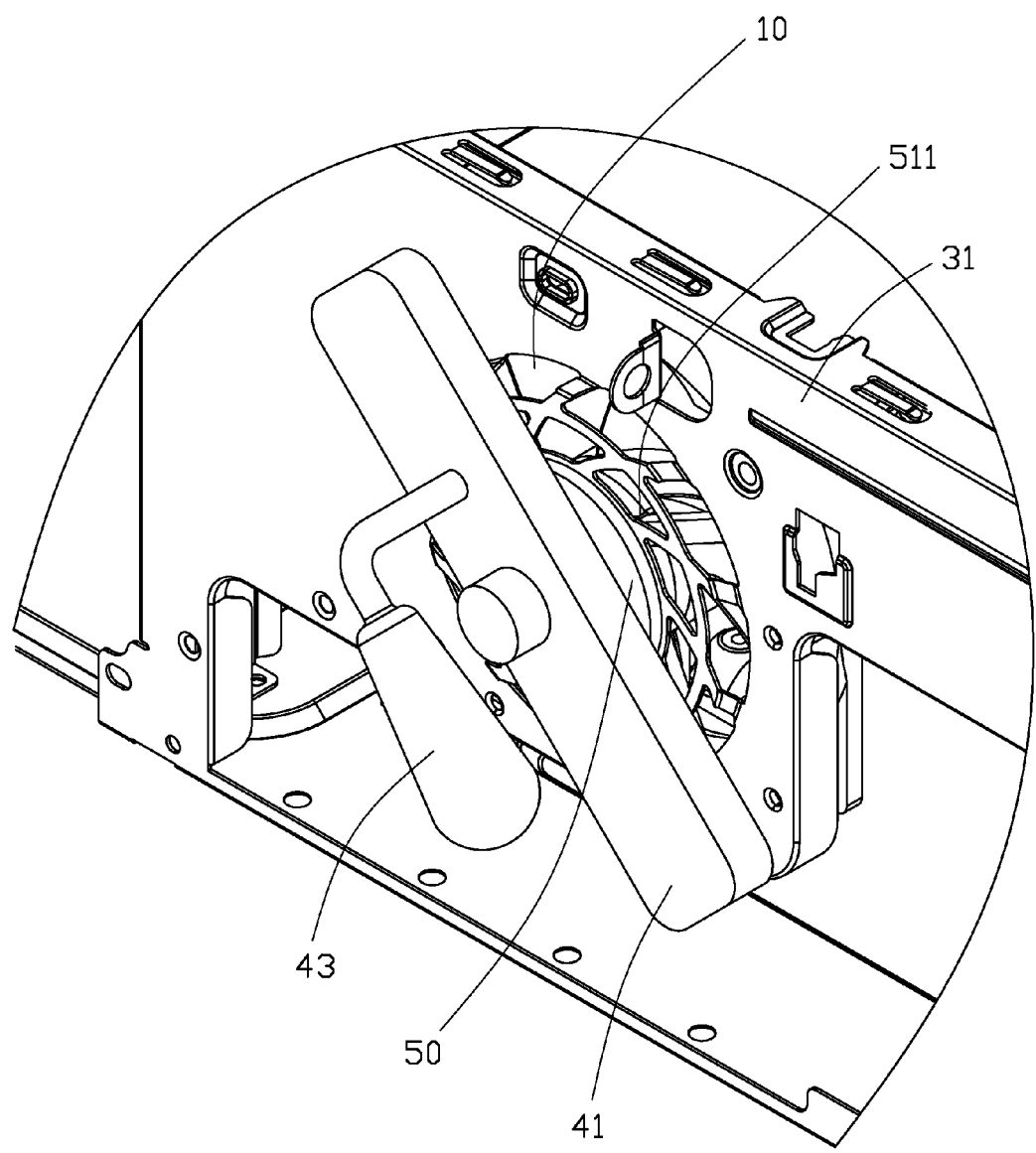
FIG. 4 is similar to FIG. 3, but the positioning tool being engaged with the enclosure.

Referring to FIGS. 3 and 4, in use, the fan 10 is placed on inner side of the rear wall 31, and each of the four installation holes 111 is aligned with each of the four securing holes 313. The two positioning pins 411 of the positioning tool are respectively inserted into two of the four installation holes 111 in diagonal and two of the four securing holes 313, to position the fan 10 on the enclosure. The three latching pins 511 of the positioning tool are inserted into the through holes 311. The pivot portion 53 is rotated around an axis perpendicular to the rear wall 31 rotating the rotating plate 51, until the fan 10 is engaged in the latching slot 5111 of the three latching pins 511 preventing the fan 10 from moving away from the rear wall 31. Two fixing members, such as screws, are respectively locked into the other two of the four securing holes 313 and the other two of the four installation holes 111, securing the fan 10 to the enclosure 30.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A positioning tool comprising:
   an actuating member, the actuating member comprising a supporting lump, and two positioning pins located on the supporting lump; and a rotating member rotatably attached to the actuating member; and the rotating member comprises a rotating plate located between the two positioning pins, three latching pins located on the rotating plate.

2. The positioning tool of claim 1, wherein the rotating member further comprises a pivot portion located on the rotating plate, the supporting lump defines a pivot hole, and the pivot portion is rotatably engaged in the pivot hole.

3. The positioning tool of claim 2, wherein the pivot hole is substantially located on a middle of the two positioning pins.

4. The positioning tool of claim 3, wherein the pivot portion is substantially columnar, the pivot hole is substantially circular, and a diameter of the pivot portion is greater than a diameter of the pivot hole.

5. The positioning tool of claim 1, wherein the actuating member further comprises a handle, and the handle comprises an operating portion and a connecting portion connected to the supporting lump and the operating portion.

6. The positioning tool of claim 1, wherein a latching slot is defined in each of three latching pins.

7. The positioning tool of claim 6, wherein a limiting post is located on the rotating plate, and the limiting post is located among the three latching pins.

8. The positioning tool of claim 1, wherein each of the positioning pins is cone-shaped.

9. The positioning tool of claim 1, wherein the three latching pins are substantially arranged at three corners of an equilateral triangle.

10. The positioning tool of claim 1, wherein the rotating plate is substantially circular.

11. A positioning tool comprising:
an actuating member, the actuating member comprising a supporting lump, two positioning pins located on the supporting lump; and
a rotating member rotatably attached to the actuating member; and the rotating member comprises a rotating plate and a pivot portion; the rotating plate located between the two positioning pins, the pivot portion located on one side of the rotating plate and engaged in the supporting lump, and three latching pins located on the rotating plate.

12. The positioning tool of claim 11, wherein the supporting lump defines a pivot hole, and the pivot portion is rotatably engaged in the pivot hole.

13. The positioning tool of claim 12, wherein the pivot hole is substantially located on a middle of the two positioning pins.

14. The positioning tool of claim 13, wherein the pivot portion is substantially columnar, the pivot hole is substantially circular, and a diameter of the pivot portion is greater than a diameter of the pivot hole.

15. The positioning tool of claim 11, wherein the actuating member further comprises a handle, and the handle comprises an operating portion and a connecting portion connected to the supporting lump and the operating portion.

16. The positioning tool of claim 11, wherein a latching slot is defined in each of three latching pins.

17. The positioning tool of claim 16, wherein a limiting post is located on the rotating plate, and the limiting post is located among the three latching pins.

18. The positioning tool of claim 11, wherein each of the positioning pins is cone-shaped.

19. The positioning tool of claim 11, wherein the three latching pins are substantially arranged at three corners of an equilateral triangle.

20. The positioning tool of claim 11, wherein the rotating plate is substantially circular.

* * * * *